United States Patent
Amer et al.

(10) Patent No.: US 12,073,305 B2
(45) Date of Patent: Aug. 27, 2024

(54) DEEP MULTI-TASK REPRESENTATION LEARNING

(71) Applicant: SRI International, Menlo Park, CA (US)

(72) Inventors: Mohamed R. Amer, Brooklyn, NY (US); Timothy J. Shields, Houston, TX (US); Amir Tamrakar, New Brunswick, NJ (US); Max Ehrlich, Princeton, NJ (US); Timur Almaev, Nottingham (GB)

(73) Assignee: SRI International, Menlo Park, CA (US)

( * ) Notice: Subject to any disclaimer, the term of this patent is extended or adjusted under 35 U.S.C. 154(b) by 1716 days.

(21) Appl. No.: 16/085,859

(22) PCT Filed: Mar. 17, 2017

(86) PCT No.: PCT/US2017/022902
§ 371 (c)(1),
(2) Date: Sep. 17, 2018

(87) PCT Pub. No.: WO2017/161233
PCT Pub. Date: Sep. 21, 2017

(65) Prior Publication Data
US 2019/0034814 A1  Jan. 31, 2019

Related U.S. Application Data

(60) Provisional application No. 62/309,804, filed on Mar. 17, 2016.

(51) Int. Cl.
*G06N 3/045* (2023.01)
*G06F 18/2132* (2023.01)
(Continued)

(52) U.S. Cl.
CPC ......... *G06N 3/045* (2023.01); *G06F 18/2132* (2023.01); *G06F 18/24* (2023.01); *G06N 5/04* (2013.01); *G06N 20/00* (2019.01)

(58) Field of Classification Search
CPC ........ G06N 5/04; G06N 3/0454; G06N 20/00; G06K 9/6234; G06K 9/6267
See application file for complete search history.

(56) References Cited

U.S. PATENT DOCUMENTS

2004/0002838 A1   1/2004   Oilver
2004/0133428 A1   7/2004   Brittan
(Continued)

OTHER PUBLICATIONS

Z.W. Tu et al. International Journal of Computer Vision, Jan. 2007, (Year: 2007).*

(Continued)

*Primary Examiner* — Dinh Nguyen
(74) *Attorney, Agent, or Firm* — MOSER TABOADA

(57) ABSTRACT

Technologies for analyzing multi-task multimodal data to detect multi-task multimodal events using a deep multi-task representation learning, are disclosed. A combined model with both generative and discriminative aspects is used to share information during both generative and discriminative processes. The technologies can be used to classify data and also to generate data from classification events. The data can then be used to morph data into a desired classification event.

12 Claims, 4 Drawing Sheets

(51) Int. Cl.
  *G06F 18/24*    (2023.01)
  *G06N 5/04*     (2023.01)
  *G06N 20/00*    (2019.01)

(56) References Cited

U.S. PATENT DOCUMENTS

| | | |
|---|---|---|
| 2005/0228763 A1 | 10/2005 | Lewis |
| 2013/0177235 A1* | 7/2013 | Meier .................. G06T 19/003 382/154 |
| 2014/0012558 A1* | 1/2014 | Mansi .................. G16H 50/50 703/11 |
| 2016/0071024 A1 | 3/2016 | Amer et al. |
| 2016/0162804 A1* | 6/2016 | Agarwal .............. G06Q 30/016 706/12 |
| 2017/0109644 A1* | 4/2017 | Nariyambut Murali ..................... G06N 7/005 |

OTHER PUBLICATIONS

Yoshua Bengio et al., Representation Learning: A Review and New Perspectives, arXiv.org [online], Apr. 23, 2014 [retrieved on May 2, 2017], Retrieved from the Internet: https://arxiv.org/abs/1206.5538>, pp. 2-3.

International Search Report and Written Opinion mailed Jun. 29, 2017 for PCT Application No. PCT/US2017/022902.

\* cited by examiner

DEEP MULTI-TASK REPRESENTATION LEARNING

BACKGROUND

In machine learning, computers are programmed to perform mathematical algorithms that can identify potentially interesting features of data, such as meaningful patterns. The machine learning algorithms create models that can be used to learn feature representations from large data sets. Once feature representations are learned, the trained model can be used to classify new instances of data.

However, as the numbers of features increase, so does the complexity of the algorithms. This increased complexity typically requires more added resources such as memory and computing power.

SUMMARY

A deep multi-task representation learning model is used for analyzing multi-task multimodal data. This enables detection of multi-task multimodal events and also generation of multimodal data. The model uses combined generative and discriminative components to share information during both generative and discriminative processes.

In one embodiment, a data analyzer comprising instructions embodied in one or more non-transitory machine accessible storage media is configured to cause a computing system comprising one or more computing devices to access a set of instances of data having a plurality of modalities, wherein the plurality of modalities are associated with a plurality of tasks and algorithmically learn a shared representation of the data using deep multi-task representation learning. The data analyzer can also be configured to learn an inference model using a combined generative and discriminative component that shares at least one parameter which is trained in unison. The data analyzer can also be configured to learn an inference model using an iterative bottom up/top down approach, configured to access at least one multi-task multimodal event label and infer data based on the at least one multi-task multimodal event label, configured to classify the data by applying a discriminative aspect to the shared representation of the multi-task multimodal data, and/or configured to generate or morph at least one event into at least one other event, configured to algorithmically infer missing data both within a modality and across modalities.

In another embodiment, a method for classifying data, the method includes, using a computing system comprising one or more computing devices, accessing a set of instances of data having a plurality of modalities, wherein the plurality of modalities are associated with a plurality of tasks, and algorithmically classifying the data using a deep multi-task representation learning model that uses a combined generative and discriminative model to generate a shared representation for determining a classification event. The method can further include learning an inference model using an iterative bottom up/top down approach for the deep multi-task representation learning model which can also include inferring an affect-task from a human body pose or a human body activity. The method can also include accessing at least one multi-task multimodal event label and inferring data based on the at least one multi-task multimodal event label.

In yet another embodiment, a system embodied in one or more computer accessible storage media for algorithmically recognizing a multi-task multimodal event in data, the system comprising a data access module to access a set of instances of data, each instance having a plurality of modalities, wherein the plurality of modalities having a plurality of associated tasks; a classifier module to classify different instances in the set of data as indicative of different events; and at least one event recognizer module to generate a semantic label for at least one recognized event. The system can also include a data generator that receives at least one multi-task multimodal event label and determines at least one multi-task multimodal data set, wherein at least one multi-task multimodal data set is used to generate a multi-task multimodal event into another multi-task multimodal event. The system can also include a hybrid model with a combined generative and discriminative component that determines parameters for an inference model.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

Figure 1:
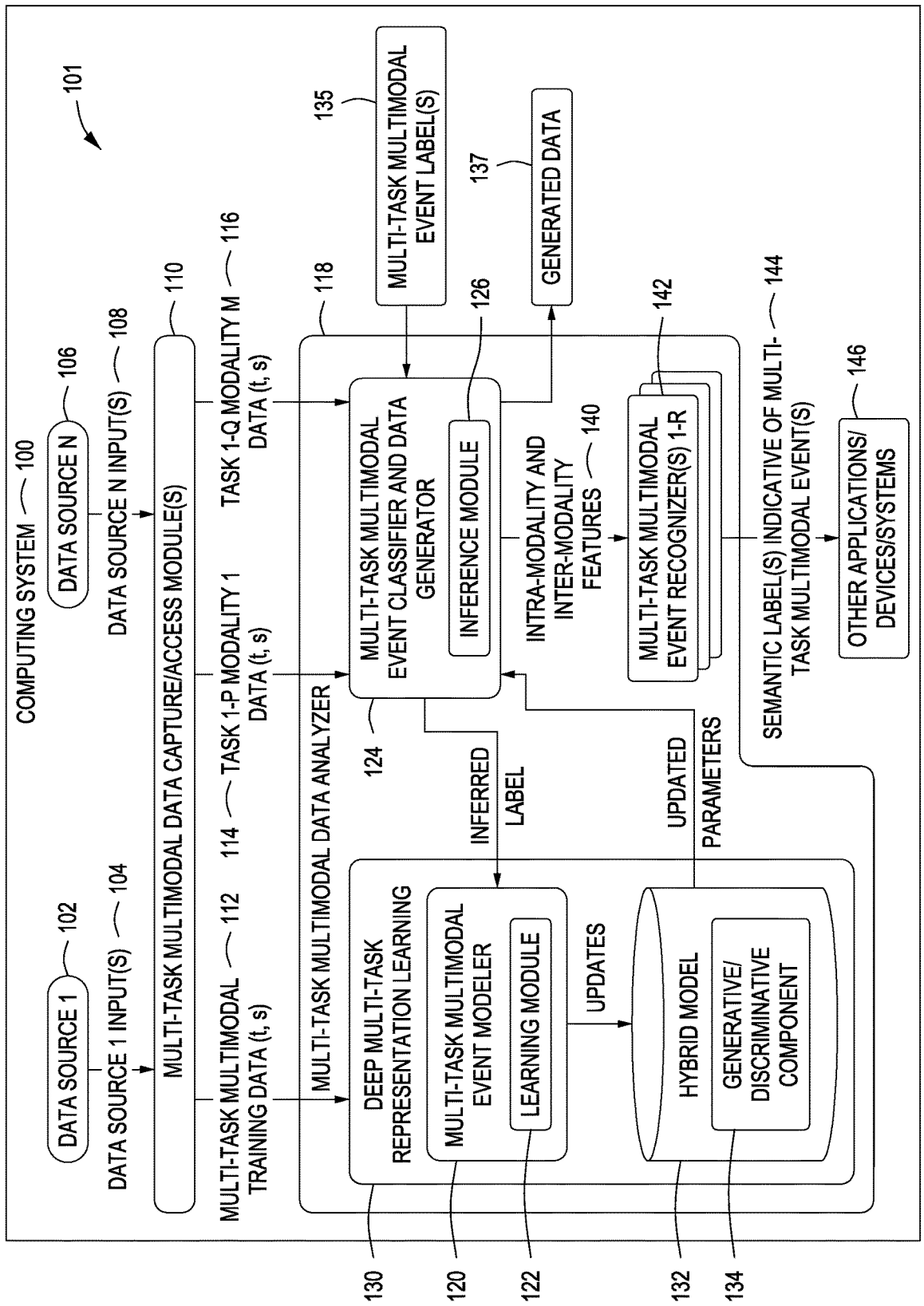
FIG. 1 is a simplified module diagram of at least one embodiment of an environment of a computing system including components for multi-task multimodal data analysis as disclosed herein.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

While the concepts of the present disclosure are susceptible to various modifications and alternative forms, specific embodiments are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

This disclosure relates to the technical fields of signal processing and data analysis. Aspects of this disclosure relate to the use of machine learning techniques to build mathematical models that can learn features of multi-task multimodal data, and to the use of such models to perform event detection from the multi-task multimodal data. For ease of discussion, in this disclosure, the term "event detection" may be used to refer to the detection of action-affect and/or other types of event detection. As used herein, "multi-task multimodal data" may refer to one or more sets of data that can include one or more tasks and at least two different types of data, e.g., different types of sensed environmental data, modes of expression or methods of communication (e.g., speech, visual imagery, tactile, gestures, etc.). Multi-task multimodal data may include audio, video, motion, proximity, gaze (e.g., eye focus or pupil dilation), sensed, measured, or computed physiological data (e.g., heart rate, blood pressure, respiration data), other types of sensed, measured, or computed data (e.g., temperature, geographic location, physical orientation with respect to some known reference), and/or other types of data.

Additionally, "multimodal" may refer to different sub-categories of data within a broader or more general category or class. For instance, "audio" data may include human speech, music, animal noises, noises made by machines and other devices (e.g., honking horns, airplane takeoff, typing on a keyboard), sounds associated with various activities (e.g., kicking a soccer ball, cutting a watermelon, crowd cheering) and/or other types of sounds. Multimodal data can include live data (e.g., observed in real time, as by a video camera, microphone, or sensing device) or previously captured or recorded data (e.g., video clips, audio files, or measured data, at least temporarily stored in computer memory). While some examples discussed herein relate primarily to the analysis of multimodal data, it should be understood that aspects of the disclosed technologies are equally applicable to any single-modality data and temporal and non-temporal data.

Many "real life" events are multimodal, with each modality containing a different type of information that may be useful for detecting or recognizing the event. As used herein, "event" may refer to any type of action or activity that may occur in the physical world, and includes, for example, interpersonal interactions, action-affect by an individual or a group, human interactions with machines, devices, food, animals, or other non-human subjects (e.g., a child kicking a ball, a person watching television, etc.), human activities (e.g., dancing, singing, speaking, etc.), events that involve only non-human subjects (e.g., a baseball breaking through a window, a telephone ringing, etc.), weather events and other acts of nature, such as thunderstorms, tornadoes, tsunamis, sunsets, waterfalls, etc.), and/or others. If only a single modality is used, other potentially valuable sources of information are lost. A single modality might be sufficient for simple event detection problems, but is inadequate when the events to be detected are complex and/or subtle (e.g., human emotions, facial expressions, events in which there are causal or temporal relationships between sub-events, etc.).

Deep learning refers to a machine learning approach for learning representations of data that uses a model architecture having multiple non-linear transformations. A "representation" may refer to a mathematical construct used to identify or communicate something about a piece of data (e.g., a "feature" of the data) in a more structured way. For example, in computer vision, the visual content of a digital image can be represented at a "low level" by a vector of intensity values per pixel, or at a higher level (e.g., in a more abstract way) as a set of edges or regions of interest.

Deep representation learning can include generative, discriminative, or hybrid models. Hybrid models include both a generative aspect and a discriminative aspect. Different approaches to developing hybrid models include joint methods, iterative methods, and staged methods. Joint methods can optimize a single objective function, which consists of both generative and discriminative energies. Iterative methods train the generative and discriminative models in an iterative manner, so that each model influences the other. In staged methods, the generative and discriminative models are trained separately, with the discriminative model being trained on feature representations learned by the generative model. Classification is performed after the training samples are projected into a fixed-dimensional space induced by the generative model. Restricted Boltzmann Machines (RBMs) can form the building blocks of deep networks models. Deep networks can be trained using the Contrastive Divergence (CD) algorithm. RBMs can be stacked together to form deeper networks known as Deep Boltzmann Machines (DBMs), which capture more complex feature representations. Deep networks-based models include Conditional RBMs (CRBMs) for time series data.

The attribute classification problem is well known in computer vision, and some problems require a high degree of complexity to model. Datasets are usually labeled with more than one label per instance. A classifier's job is to partition the feature space by drawing boundaries that maximally separate the different classes while sharing the discriminative features between the different attributes. With the growing number of attributes, the model complexity begins to increase exponentially, and it becomes harder to maintain a high attribute classification accuracy and still harder to train the model. In this disclosure, the attribute classification problem is cast as a multi-task classification problem and a new hybrid model is utilized—the Deep Multi-Task Representation Learning (DMTRL) model that jointly learns a shared feature representation and decision boundaries. The DMTRL enables learning a shared representation using multiple sets of labels resulting in a factored feature representation while maintaining a low number of model parameters. Generative models, such as Restricted Boltzmann Machines (RBMs), are enhanced with a discriminative factored multi-task component that does not increase exponentially with added tasks. Conditional Restricted Boltzmann Machines (CRBMs) variants can also be utilized to enable modeling temporal data. The outcome is a versatile approach that can be applied to different data types (static, dynamic and multimodal) as well as a different number of labels (multi-tasks). This approach possesses superior classification performance improvements over the state-of-the-art while still maintaining a low number of modeling parameters. An iterative learning approach is utilized that consists of bottom-up/top-down passes of contrastive divergence to learn the shared representation and, at inference, a bottom-up pass is used to predict the different tasks. The bottom-up approach uses deep learning to progress from the modality data to the label. The top-down approach uses representation learning to progress from the label to the modality data (determining missing data). Since the model scaling is factorization based instead of exponentially based, the model requires substantially less computing assets such as, for example, less memory, less processing power, less processing time, and less storage than previous techniques.

The advantages of the DMTRL model also include a joint optimization of generative and discriminative aspects into a single non-staged framework. Processing no longer requires a serial approach (an output from a generative model feeding an input to a discriminative model) as the data can be processed together. Another advantage is that the multi-tasking aspect permits multiple sets of classes to be output rather than just a single set of classes. This includes having multiple types of classes. Another advantage is that a full vector of data is not required to use the model (can have missing data).

As disclosed herein, embodiments of a computing system 100 are configured to utilize combinations of cues from multiple different tasks and modalities to reason about specific events. As used herein, "cue" may refer to any feature, sequence of features, or combination of features detected in the multi-task multimodal data. Cues may include, for example, sounds, movements, speech, changes in physiological data, changes in geographic location, and visual features (e.g., faces, objects, people, gestures, gaze, landscapes/scenery, actions, etc.). Embodiments of the computing system 100 can jointly interpret and reason about the information from different tasks and modalities while also accounting for temporal and non-temporal information within and across the different tasks and modalities, using a deep multi-task representation learning.

Referring now to FIG. 1, an embodiment of the computing system 100 is shown in the context of an environment 101 (e.g., a physical or virtual execution or runtime environment). The illustrative computing system 100 includes one or more data sources 102, 106, one or more multi-task multimodal data capture/access module(s) 110 (hereinafter "data access modules 110"), a multi-task multimodal data analyzer 118 (which includes a number of subcomponents, described below), and one or more other applications/devices/systems 146. Each of the components 102, 106, 110, 118, 146 of the computing system 100 and their respective subcomponents may be embodied as hardware, software, a combination of hardware and software, or another type of physical component.

The data access modules 110 capture, obtain, receive, or access a number of multi-task multimodal inputs 104, 108 from time to time during operation of the computing system 100. The data access modules 110 can also be utilized to output, store or access data that is generated/inferred by a multi-task multimodal event classifier and data generator 124 (described below). The multi-task multimodal inputs 104, 108 are generated, transmitted, or otherwise made available by a number "N" (where N is a positive integer greater than one) of data sources 102, 106. The illustrative data sources 102, 106 may be embodied as any hardware, software, or combination of hardware and software capable of performing the functions described herein. For instance, the data sources 102, 106 may include one or more sensing devices (e.g., cameras, microphones, environment sensors, etc.), which "observe" or collect information about a live, "real life" physical setting and capture multi-task multimodal data, such as non-verbal and verbal audio inputs, visual imagery, any of the other types of multi-task multimodal data mentioned above, and/or others. Alternatively or in addition to, the data sources 102, 106 may include computers, computer networks, memory, storage devices, or any other types of devices capable of storing and/or transmitting stored or recorded multi-task multimodal data such as audio files, digital image files, video clips, and/or other types of data files. The data sources 102, 106 can be of the same type or different types or can have the same properties or different properties.

The illustrative data access modules 110 and each of its sub-components, submodules, and data structures may be embodied as any hardware, software, or combination of hardware and software capable of performing the functions described herein. For example, the data access modules 110 can include data acquisition and signal processing routines, video processing modules, image processing modules, speech recognition and/or natural language understanding modules, low-level feature detection modules, pre-processors, and/or other types of modules that prepare the inputs 104, 108 for use by the multi-task multimodal data analyzer 118.

In preparing the inputs 104, 108 for use by the multi-task multimodal data analyzer 118, the data access modules 110 may add temporal information to the inputs 104, 108, such as date-time stamps. The data access modules 110 transmit, expose, or otherwise provide the multi-task multimodal data analyzer 118 with access to the multi-task multimodal inputs 104, 108 as pre-processed. The pre-processed inputs 104, 108 are shown in FIG. 1 as multi-task multimodal training data (t,s) 112, task 1 to P, modality 1 data (t,s) 114, and task 1 to Q, modality M data (t,s) 116. The multi-task multimodal training data (t,s) 112 is a data set containing many instances of labeled and/or unlabeled multi-task multimodal data, which are used to train a hybrid model 132 (where "labeled" indicates that features of the data have already been identified ("known"), e.g., handcrafted by manual tagging, enabling the use of supervised machine learning, and "unlabeled" indicates "raw" multi-task multimodal data for which unsupervised machine learning is used). The task 1 to P, modality 1 data (t,s) 114 and task 1 to Q, modality M data (t,s) 116 are new instances of unlabeled multi-task multimodal data that are not contained in the training data 112, where "M," "P," and "Q" are positive integers greater than zero, and M, P, and Q may each be different than N (e.g., a single data source may provide multiple tasks for each of the multiple modalities or multiple data sources may provide different instances of the same task and modality, e.g., two different video sources). The designations "(t,s)" are provided simply for ease of discussion, as an indication in FIG. 1 that, in the illustrative embodiment, each instance of the data 112, 114, 116 can have, but is not required to have, a temporal component represented by at least t=timestamp and/or s=sampling rate (or sample size/duration). The data 112, 114, 116 can be of different data types such as, for example, dynamic (temporal) data, static (non-temporal) data, continuous data, discrete data, etc. and can come from any type of data source.

The illustrative multi-task multimodal data analyzer 118 and each of its sub-components, submodules, and data structures may be embodied as any hardware, software, or combination of hardware and software capable of performing the functions described herein. For ease of discussion, and as described in more detail below, the multi-task multimodal data analyzer 118 is shown as including both the functionality for constructing a hybrid model 132 using multi-task multimodal training data 112 (e.g., components 120, 122, 130) and the functionality for event detection in new data samples 114, 116 (e.g., components 124, 126, 142). In other embodiments, the model building and event detection functionality may be implemented as separate components or on different computing devices or systems.

The multi-task multimodal data analyzer 118 utilizes a deep multi-task representation learning 130 to build the hybrid model 132. In the deep multi-task representation learning, low-level feature extraction, detection, and fusion (e.g., joint representation) of the low-level features of the multiple different data streams can occur. Low-level feature detection involves processing the raw streams of the various different types of multi-task multimodal data to recognize the low-level features depicted therein or represented thereby. Such processing may be done for multiple tasks and multiple modalities in parallel (e.g., concurrently across multiple tasks and multiple modalities) or sequentially, or independently of other tasks and modalities, or in an integrated fashion. Deep multi-task representation learning allows multi-task learning to be applied to representation learning. It is a way to regularize representation learning to make it more specific to a task. Deep multi-task representation learning operates within the intersection of machine learning (multi-task learning), representation learning, and deep learning.

Early, intermediate, and/or late fusion techniques may be used in the analysis of the multi-task multimodal data. Early fusion techniques can fuse the various multi-task multimodal streams of data together first and then perform feature detection on the fused stream. Late fusion techniques perform feature detection on the separate streams of data first and then fuse the streams together later. "Intermediate" fusion refers to a technique that enables the level of fusion to be learned, meaning that the optimization is set up in a manner that chooses the right point on the continuum between early and late fusion through the use of data driven learning. For example, as disclosed herein, embodiments of the system 100 can perform multi-task multimodal data fusion using the hybrid model 132 that includes a "neuro-inspired" component such as Conditional Restricted Boltzmann Machines (CRBMs).

The hybrid model 132 supplies modeling parameters to a multi-task multimodal event classifier and data generator 124 to create an inference module 126. To build the hybrid model 132, the multi-task multimodal event modeler 120, including a learning module 122, executes deep multi-task representation learning algorithms on the multi-task multimodal training data (t,s) 112, as described in more detail below. The learning module 122 uses a non-staged hybrid model 132. The hybrid model 132 includes a combined generative/discriminative component 134 with each aspect trained in unison rather than separately. The generative/discriminative component 134 optimizes both generative and discriminative aspects in a single, non-staged framework. Parameters are learned together at the same time, unlike staged components that feed their output into another component (serial processing). The hybrid model 132 provides updated parameters (trained parameters) to the multi-task multimodal event classifier and data generator 124. The deep multi-task representation learning 130 can be used to train the models as a onetime event and/or be used to learn when new training data becomes available. The deep multi-task representation learning 130 can also learn while the multi-task multimodal event classifier and data generator 124 is processing data. At a convenient time, the multi-task multimodal event classifier and data generator 124 can then be updated with the learned parameters. For example, a new event can be introduced and the new event and its training data can be input into the deep multi-task representation learning 130 for learning while the multi-task multimodal event classifier and data generator 124 continues to infer data. A new event recognizer can then be added and the inference module 126 updated at a convenient time. The hybrid model 132 can be implemented in software, hardware, or a combination of software and hardware. For example, portions of the hybrid model 132 may be implemented as computer program code, logic, instructions, and/or data structures such as vectors, arrays, trees, graphs, etc. Illustrative embodiments of the hybrid model 132 are described in more detail below.

The illustrative multi-task multimodal event classifier and data generator 124, including an inference module 126, classifies sets of time-varying and non-time varying multi-task multimodal data 114, 116 using the hybrid model 132.

The classifier 124 can be embodied as an automated tool that can be called upon by other applications, systems, devices, services, or processes, to perform multi-task multimodal data analysis. As described in more detail below, the multi-task multimodal event classifier and data generator 124 identifies intra-modality and inter-modality features 140, of the multi-task multimodal data 114, 116. Classification results produced by the multi-task multimodal event classifier and data generator 124 can be fed back to the deep multi-task representation learning 130 as shown by the arrow connecting the classifier 124 to the multi-task multimodal event modeler 120. In some embodiments, the multi-task multimodal event modeler 120 compares the inferred label from the multi-task multimodal event classifier and data generator 124 with the known label to determine a level of agreement. If the inferred label equals the known label, training can be halted. In other embodiments, the training is not halted until the training data has been exhausted. Inferencing can still take place even if the training or the training data does not yield a complete set of parameters. The multi-task multimodal event classifier and data generator 124 can also be utilized in 'reverse' (to infer data from events rather than to infer events from data) where multi-task multimodal event label(s) 135 are fed back into the multi-task multimodal event classifier and data generator 124. The multi-task multimodal event label(s) 135 is then used to create generated data 137 based on an event label and, optionally, additional data. The generated data 137 can then be used to morph events into other events as described in detail below.

An example of intra-modality features includes changes in the shape of a person's lips over time: at time t1, the lips are straight and close together; at time t2, the ends of the lips are curled upward/downward; at time t3, there is vertical space between the lips. A feature that may be inferred from this combination of features over time is that the person is beginning to laugh. The foregoing example is intra-modal because all of the detected features are visual. An example of inter-modality features includes: at time t1, a vehicle is detected in front of a building; at time t2, the vehicle is detected slightly past the same building; at time t3, a braking sound is detected; at time t4, a "crunch" sound is heard. A feature that may be inferred from this combination of features over time is that the vehicle was involved in a crash. The vehicle example is inter-modal because some of the detected features are visual and some of the detected features are audio.

The illustrative multi-task multimodal event recognizer(s) 1-R 142 associates semantic labels indicative of multi-task multimodal event(s) 144 with one or more of the features 140 (e.g., as meta-tags or annotations). There can be any number of event recognizers 142, the number is based on the number of events to be recognized. Thus, the variable "R" can represent any positive integer greater than 1. The semantic label(s) 144 can be embodied as human-intelligible descriptive labels, e.g., as natural language words or phrases that describe one or more features of the multi-task multimodal data 114, 116, as opposed to numerical values or computer code. The semantic label(s) 144 can be embodied as, for example, text and/or system-generated verbal output (which can be produced using, e.g., a natural language generator (NLG) and a text-to-speech (TTS) module). Each of the multi-task multimodal event recognizer(s) 1-R 142 can be a separate entity, but operate on the same inference module 126. This permits simultaneous inference of multiple events based on the output of the inference module 126. The multi-task multimodal event recognizer(s) 1-R 142 can utilize different weight matrices for each event. The multi-task multimodal event recognizer(s) 1-R 142 are trained jointly.

The multi-task multimodal event recognizer(s) 1-R 142 supplies or otherwise makes available the semantic label(s) 144 to one or more other applications, devices, systems, services, or processes 146, which may have requested the multi-task multimodal data analysis. For example, the multi-task multimodal event recognizer(s) 1-R 142 may transmit, expose, or otherwise make available the semantic label(s) 144 to a search engine, an event detector component of a computer vision application programming interface (API) or toolbox, a human-computer interface module, a navigation system, a gaming system, a virtual reality or augmented reality system, a virtual personal assistant system, a communication system (such as a messaging system, e.g., email, text, voice, or multimodal messaging, social media, video conferencing system, etc.), a health monitoring device or system, and/or any number of other requesting systems, applications, devices, services or processes. Alternatively or in addition, the multi-task multimodal event recognizer(s) 1-R 142 may simply cause the semantic label(s) to be stored in computer memory (e.g., by updating a searchable data store) for later use/access by one or more requesters.

Figure 2A:
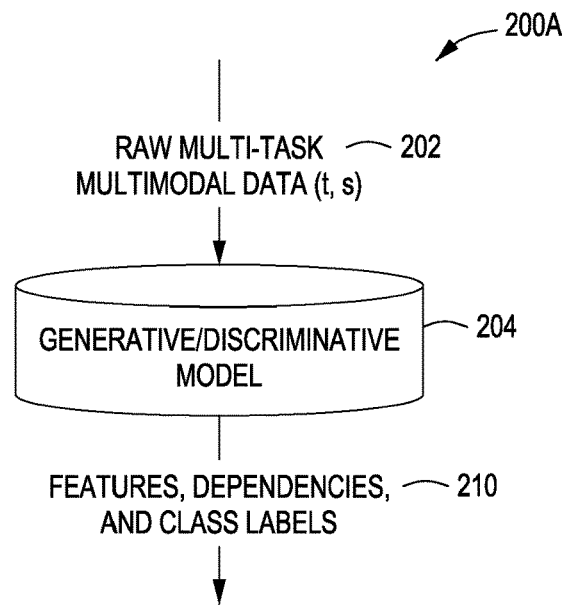
FIGS. 2A and 2B are simplified schematic and graphical diagrams of embodiments of hybrid models that may be used in connection with the multi-task multimodal data analysis system of FIG. 1.

Referring now to FIG. 2A, a simplified illustration of an embodiment 200A of the hybrid model 132, including the generative/discriminative component 134, is shown. In FIG. 2A, raw (e.g., unlabeled) multi-task multimodal data 202 is analyzed by a generative/discriminative model 204. The generative/discriminative model 204 generates a feature representation that identifies features and dependencies of the multi-task multimodal data 202. A discriminative aspect of the generative/discriminative model 204 then performs higher level reasoning on the feature representation and infers class labels/events. In general, the embodiment 200A uses deep networks to perform multi-task multimodal fusion of data. The generative/discriminative model 204 may utilize Conditional Restricted Boltzmann Machines (CRBMs). The CRBM uses an undirected model with binary latent variables connected to a number of visible variables. The CRBM-based generative aspect of the generative/discriminative model 204 enables modeling multi-task multimodal phenomenon and also can account for missing data by generating the missing data within or across modalities. The embodiment 200A utilizes a non-staged hybrid architecture, in which the generative aspect generates model data, while the discriminative aspect determines correlations (labels/events). The generative/discriminative model 204 outputs features, dependencies and class labels 210. The outputs can be utilized to update inference processing.

Figure 2B:
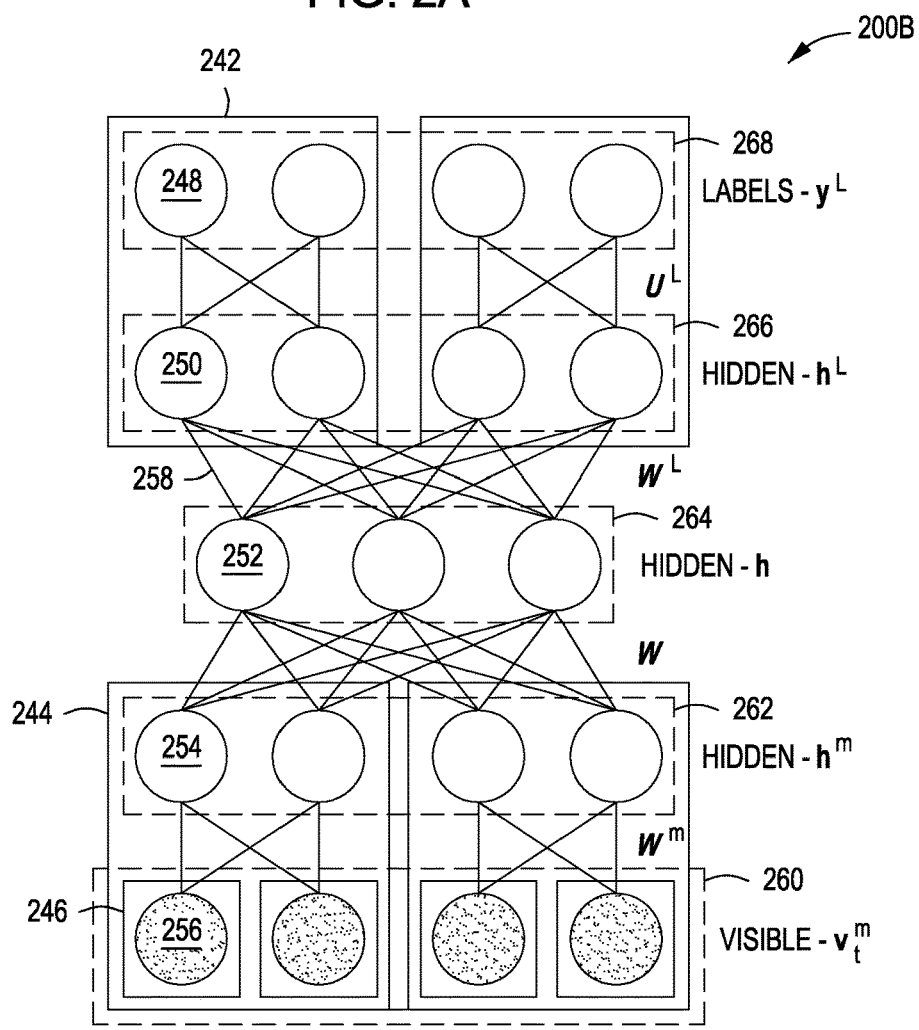

FIG. 2B illustrates a graphical representation of the hybrid model 132. The boxes 242-246 represent possible state associations, the lines 258 represent inter-state dependencies, each having a weight value W or U, and the circles 248-256 represent individual states. Hidden states are designated by h, observable states are designated by v, and labels are designated by a y. In some embodiments, hidden states can be revealed by the modeling technique. In some cases, the hidden states can represent meaningful details that would otherwise not be apparent. Instances of data associated with various modalities are used to create states of a plurality of modalities 260. The plurality of modalities 260 is used to generate a modality specific representation layer 262. The graphical representation of the hybrid model 132 uses lines with weights $W^m$ to show the dependencies between the plurality of modalities 260 and states in the modality representation layer 262. The states of the modality representation layer 262 are fused to create states of a shared representation layer 264, producing dependencies and weights W. The shared representation layer 264 is then separated into states of a task representation layer 266, producing dependencies and weights $W^L$. The task representation layer 266 is used to create a task specific representation layer 268 with dependencies and weights $U^L$. The task specific representation layer 268 yields labels/classifications given the plurality of modalities 260. During discriminative processes, progress is made from a bottom up approach from the plurality of modalities 260 to the specific task representation layer 268 to ultimately determine a label or classification. During generative processes, progress is made from a top down approach from the task specific representation layer 268 to the plurality of modalities 260 to generate data. A highly simplified description of a mathematical representation of the hybrid model 200B follows.

A CRBM, by adding a discriminative term, can be extended to a discriminative CRBM (D-CRBM). In a similar manner, a CRBM can also be extended to be a multi-task CRBM (MT-CRBM). The MT-CRBMs learn a shared representation layer for all given tasks. The MT-CRBMs can then be extended to multimodal MT-CRBMs (MTM-CRBMs). A MTM-CRBMs combines a collection of unimodal MT-CRBMs, one for each visible modality. The hidden representations produced by the unimodal MT-CRBMs are then treated as the visible vector of a single fusion MT-CRBM. The result is an MTM-CRBM model that relates multiple temporal and/or non-temporal modalities to multi-task classification labels. MTM-CRBMs define the probability distribution $p_{MTM}$ as a Gibbs distribution (Eq. 1). The MTM-CRBMs learn an extra representation layer for each of the modalities, which learns a modality specific representation as well as the shared layer for all the tasks.

A probability distribution $p_{MTM}$ determined as a Gibbs distribution, where v is a vector of visible nodes, h is a vector of hidden nodes, $E_{MTM}$ is the energy function, and Z is the partition function. The parameters θ to be learned are a and b, the biases for v and h respectively, and the weights W.

$$p_{MTM}(y_t^L, h_t, h_t^{1:M}, v_t^{1:M} \mid v_{<t}^{1:M}) = \quad \text{(Eq. 1)}$$

$$\exp[-E_{MTM}(y_t^L, h_t, h_t^{1:M}, v_t^{1:M} \mid v_t^{1:M})]/Z(\theta),$$

$$Z(\theta) = \sum_{y,v,h} \exp[-E_{MTM}(y_t^L, h_t, h_t^{1:M}, v_t^{1:M} \mid v_{<t}^{1:M}),$$

$$\theta = \begin{bmatrix} \{a^{1:M}, b^{1:M}, e, s^L\} & -\text{bias,} \\ \{A^{1:M}, B^{1:M}, C^{1:M}\} & -\text{auto regressive,} \\ \{W^{1:M}, U^{1:M}, W, U^L\} & -\text{fully connected.} \end{bmatrix}$$

Note that A and B are matrices defining dynamic biases for $v_t$ and $h_t$, consisting of concatenated vectors of previous time instances of a and b.

The hidden layer h is defined as a function of the labels $y^L$ and the visible nodes v. A new probability distribution for the classifier is defined to relate the label $y^L$ to the hidden nodes h is defined as in (Eq. 2).

$$p_{MTM}(v_{i,t}^m \mid h_t^m, v_{<t}^m) = \mathcal{N}\left(c_i^m + \sum_j h_j^m w_{ij}^m, 1\right), \quad \text{(Eq. 2)}$$

$$p_{MTM}(h_{j,t}^m = 1 \mid y_t^L, v_t^m, v_{<t}^m) =$$
$$\sigma\left(d_j^m + \sum_{l,k} y_{k,t}^l u_{jk}^m + \sum_i v_{i,t}^m w_{ij}^m\right),$$

$$p_{MTM}(y_{k,t}^l \mid h_t^m) = \frac{\exp\left[s_k^l + \sum_j u_{jk}^{m,l} h_{j,t}^m\right]}{\sum_{l^*} \exp\left[s_{k^*}^l + \sum_j u_{jk^*}^{m,l} h_{j,t}^m\right]},$$

$$p_{MTM}(h_{n,t} = 1 \mid y_t^L, h_t^{1:M}, h_{<t}^{1:M}) =$$
$$\sigma\left(f_n + \sum_{l,k} y_{k,t}^l u_{nk}^l + \sum_{m,j} h_{j,t}^m w_{jn}^m\right),$$

$$p_{MTM}(y_{k,t}^l \mid h) = \frac{\exp\left[s_k^l + \sum_j u_{nk}^l h_n\right]}{\sum_k \cdot \exp[s_{k^*}^l + \sum_n u_{nk^*}^l h_n]}.$$

where, $$c_i^m = a_i^m + \sum_p A_{p,i}^m v_{p,<t}^m, \quad \text{(Eq. 3)}$$
$$d_j^m = b_j^m + \sum_p B_{p,j}^m v_{p,<t}^m,$$
$$f_n = e_n + \sum_{m,r} C_{r,n}^m h_{r,<t^*}^m.$$

The new energy function $E_{MTM}$ is defined in (Eq. 4).

$$E_{MTM}(y_t^L, h_t, h_t^{1:M}, v_t^{1:M} \mid v_{<t}^{1:M}) = \sum_m E_{MT}(y_t^L, h_t^m, v_t^m \mid v_{<t}^m) - \quad \text{(Eq. 4)}$$
$$\underbrace{\sum_j f_n h_{n,t} - \sum_{j,k,m} h_{j,t}^m w_{j,n} h_{n,t}}_{\text{Fusion}} - \underbrace{\sum_{k,l} s_k^l y_{k,t}^l - \sum_{n,k,l} h_{n,t} u_{nk}^l y_{k,t}^l}_{\text{Multi-Task}}$$

Inference for the MTM-CRBM is the most general case and, therefore, is discussed as the generalized example. To perform classification at time t in the MTM-CRBM given $v_{<t}^{1:M}$ and $v_t^{1:M}$, a bottom-up approach is used, computing the mean of each node given the activation coming from the nodes below it; that is, the mean of $h_t^m$ is computed using $v_{<t}^m$ and $v_t^m$ for each modality, then the mean of $h_t$ is computed using $h_{<t}^{1:M}$, then the mean of $fy_t^L$ is computed for each task using $h_t$, obtaining the classification probabilities for each task.

Learning is done using Contrastive Divergence (CD), where $<\bullet>_{data}$ is the expectation with respect to the data and $<\bullet>_{recon}$ is the expectation with respect to the reconstruction. The learning is done using two steps: a bottom-up pass and a top-down pass using sampling equations for MTM-CRBM. In the bottom-up pass the reconstruction is generated by first sampling the unimodal layers $p(h_{t,j}^m = 1 \mid v_t^m, v_{<t}^m, y_t)$ for all the hidden nodes in parallel. This is followed by sampling the fusion layer $p(h_{t,n} = 1 \mid y_{k,t}^L, h_t^{1:M}, h_{<t}^{1:M})$. In the top-down pass the unimodal layer is generated using the activated fusion layer $p(h_{t,j}^m = 1 \mid h_t, y_{k,t}^L)$. This is followed by sampling the visible nodes $p(v_{t,i}^m \mid h_t^m, v_{\le t}^m)$ for all the visible nodes in parallel.

Figure 3:
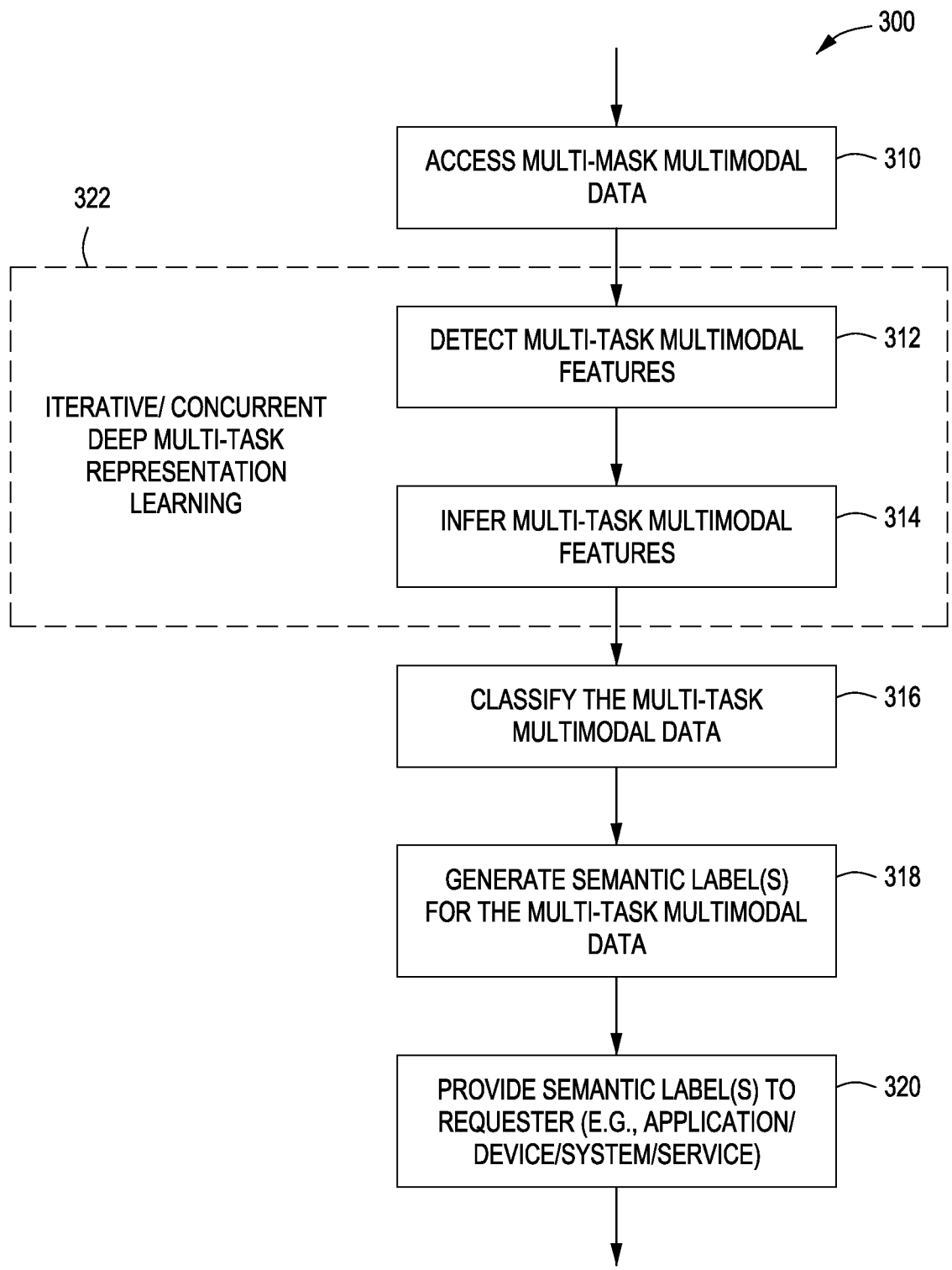
FIG. 3 is a simplified flow diagram of at least one embodiment of a method by which the system of FIG. 1 may perform multi-task multimodal data analysis and/or perform action-affect recognition.

Referring now to FIG. 3, an illustrative method 300 for event detection in multi-task multimodal data is shown. The method 300 may be embodied as computerized programs, routines, logic and/or instructions of the computing system 100, of the data access module 110 and/or the multi-task multimodal data analyzer 118, for example. At block 310, the system 100 accesses multi-task multimodal data, such as audio and video data streams, or a variety of different multi-task multimodal data streams having various instances. Loop 322 signifies that blocks 312, 314 can be performed iteratively and/or concurrently, using the deep multi-task representation learning described above. In block 312, the system 100 detects one or more multi-task multimodal features in the multi-task multimodal data obtained in block 310. To do this, the system 100 utilizes a generative/discriminative component of the deep multi-task representation learning (e.g., generative/discriminative component 134 of hybrid model 132).

In block 314, the system 100 infers one or more multi-task multimodal features in the multi-task multimodal data, based on the output of block 312. To do this, the system 100 uses a generative/discriminative component such as generative/discriminative component 134 of hybrid model 132. In block 316, the system 100 classifies the instances of multi-task multimodal data based on the multi-task multimodal features detected in block 312, and the multi-task multimodal features inferred in block 314. For example, the system 100 may reason that a visual feature indicative of lightning detected in frame 2 is related to an audio feature indicative of thunder detected in frame 4. The multi-task multimodal data can be considered non-stationary or time-varying because the lightning may be detected only in frame 2 and not in other frames, and the thunder may be detected only in frame 4 and not in other frames of the video. In block 318, the system 100 generates one or more semantic labels for the multi-task multimodal data based on the results of blocks 312, 314, and 316. For example, the system 100 may label the combination of visual features of frame 2 and audio features of frame 4 as a "thunderstorm." Semantic labels can be associated with feature classifications using, for example, an ontology or a mapping table. In block 320, the system 320 supplies the semantic label(s) established in block 318 to a requesting application, device, system or service, or simply stores the semantic labels for future use.

The components of the multi-task multimodal data analysis system 100 have a number of different applications. Embodiments of the system 100 can enable recognition of multi-task multimodal action-affect and modeling of interpersonal (e.g., social) interactions. Embodiments of the system 100 can enable fluid, lifelike human-computer interaction for a variety of applications including training, machine operation, operating remotely piloted aircraft, large scale surveillance and security systems, flight control systems, video games, navigation, etc.

Embodiments of the system 100 can be used in the interpretation, search, retrieval, and/or classification of multi-task multimodal data. For example, embodiments of the system 100 can be used to automatically interpret and classify online video content and/or to make content recommendations. Embodiments of the system 100 can perform multi-task multimodal interpretation, e.g., action-affect or sentiment analysis, or complex event analysis, using the multi-task multimodal data (e.g., for automated video analysis). For instance, an automated image, video, or multi-task multimodal message analysis may include a sentiment analysis that may be performed based on a combination of speech, non-verbal audio, and visual features (e.g., tone, background audio, spoken words, displayed text and graphics, activities, and/or other multimodal features) of images or video.

Embodiments of the system 100 can make correlations, such as temporal and/or cause and effect relationships, between different multi-task multimodal data streams, e.g., to determine how data streams of multiple different multi-task modalities are related, particularly when the data streams, or events in the data streams, are not temporally aligned (e.g., lightning at time t1 in visual data stream+ thunder at time t2 in audio data stream). Embodiments of the system 100 can model "sub-phenomena" such as very short term events, and then connect the short term events together to draw an inference or generalize the short term events into a larger or more abstract event category. Embodiments of the system can be used to improve the capabilities of virtual personal assistant applications including smart calendar applications, health and fitness monitoring applications, spoken dialog based automated assistants, social media applications, and multimodal messaging applications (e.g., messaging systems that permit a combination of audio or video messages and text messages).

Embodiments of the system 100 can also be used to provide multi-task learning for body affect. A motion capture device can provide data sources of human body movements and attributes. Actions can include, for example, walking, knocking, lifting, and throwing. Affect styles can include, for example, angry, happy, neutral, and sad. The data source could then include an action or actions combined with an affect style or styles. Each data source can represent an 'instance' of a human body (e.g., a point in time when an action and/or affect is occurring—for example—walking (action) angrily (affect)). Each data instance can include one or more actions and one or more affects.

Embodiments of the system 100 can also be used in morphing. An MTM-CRBM model trained on a body affect dataset is capable of data generation (inferring data from events instead of inferring events from data). For example, a human body that is neutrally walking can be morphed into a human body that is happily walking. A sequence is morphed by sweeping through its frames, updating the vector $v_t$ of each frame in order. To update $v_t$, first compute the expected value of $h_t$ given $v_{<t}$, $v_t$ and $y_t^L$, then compute the expected value of $v_t$ given $v_{<t}$ and $h_t$. The $v_{<t}$ is used as a linear blend of the original sequence, and the newly generated sequence, so that the generated sequence retains the general shape of the original sequence. To evaluate the morphing process, take a Neutral sequence for each action and each actor; morph it to, for example, a Happy, Sad, or Angry sequence of the same action type; and then compare the classifier probability of the target affect for the original Neutral sequence and the generated Happy, Sad, or Angry sequence.

Figure 4:
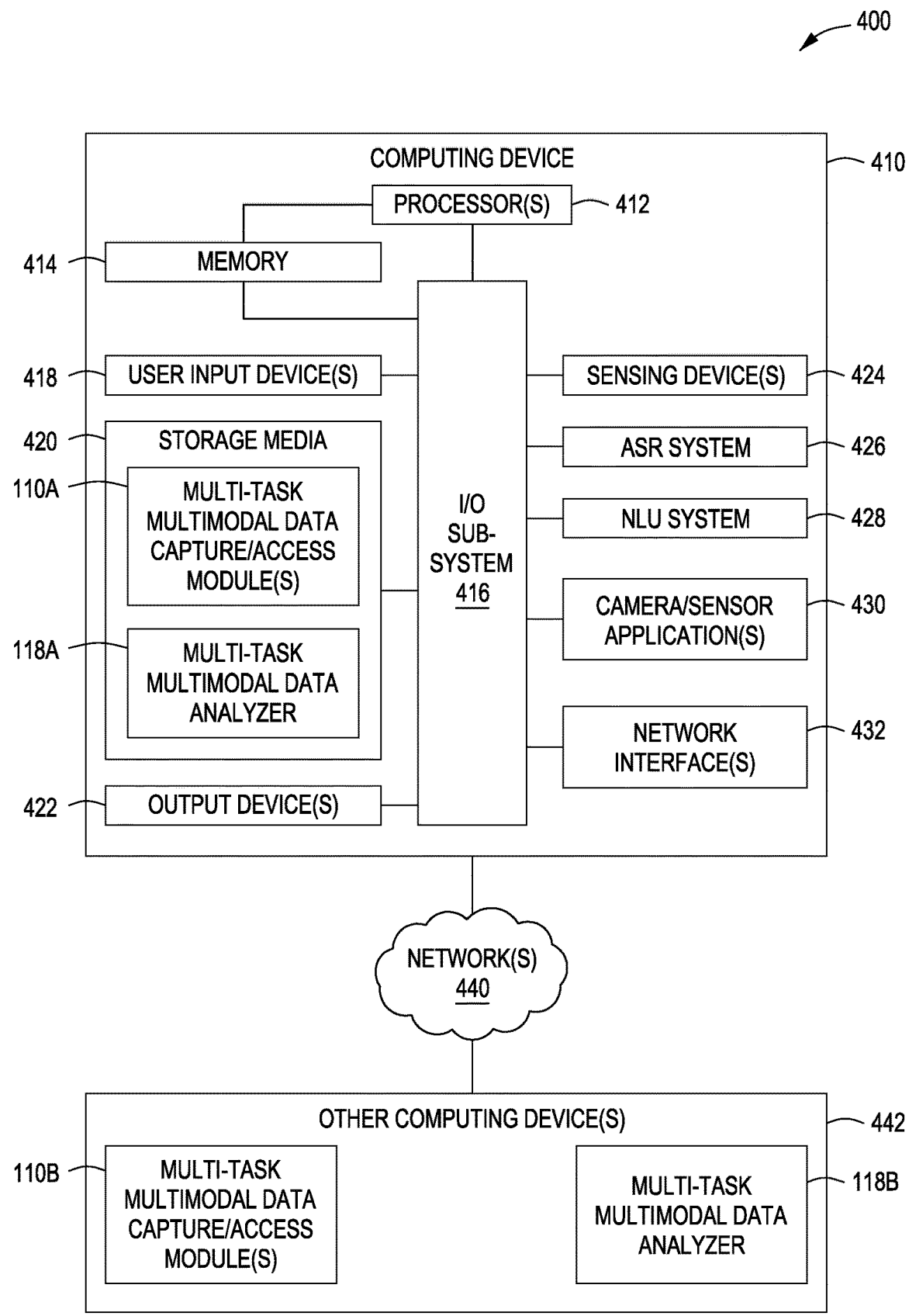
FIG. 4 is a simplified block diagram of an exemplary computing environment in connection with which at least one embodiment of the system of FIG. 1 may be implemented.

Referring now to FIG. 4, a simplified block diagram of an exemplary computing environment 400 for the computing system 100, in which the multi-task multimodal data analyzer 118 may be implemented, is shown. The illustrative implementation 400 includes a computing device 410, which may be in communication with one or more other computing systems or devices 442 via one or more networks 440. Illustratively, a portion 118A of the multi-task multimodal data analyzer 118 is local to the computing device 410, while another portion 118B is distributed across one or more of the other computing systems or devices 442 that are connected to the network(s) 440. For example, in some embodiments, portions of the hybrid model 132 may be stored locally while other portions are distributed across a network (and likewise for other components of the multi-task multimodal data analyzer 118). In some embodiments, however, the multi-task multimodal data analyzer 118 may be located entirely on the computing device 410. Similarly, a portion 110A of the multi-task multimodal data capture/access module(s) 110 may be local to the computing device 410 while another portion 110B is distributed across one or more of the other computing systems or devices 442 that are connected to the network(s) 440, or the module(s) 110 may all be located on the computing device 410.

In some embodiments, portions of the multi-task multimodal data analyzer 118 and/or the multi-task multimodal data capture/access module(s) 110 may be incorporated into other systems or interactive software applications. Such applications or systems may include, for example, operating systems, middleware or framework (e.g., application programming interface or API) software, and/or user-level applications software (e.g., a search engine, a virtual personal assistant, a messaging application, a web browser, another interactive software application or a user interface for a computing device).

The illustrative computing device 410 includes at least one processor 412 (e.g. a microprocessor, microcontroller, digital signal processor, etc.), memory 414, and an input/output (I/O) subsystem 416. The computing device 410 may be embodied as any type of computing device such as a personal computer (e.g., a desktop, laptop, tablet, smart phone, wearable or body-mounted device, etc.), a server, an enterprise computer system, a network of computers, a combination of computers and other electronic devices, or other electronic devices. Although not specifically shown, it should be understood that the I/O subsystem 416 typically includes, among other things, an I/O controller, a memory controller, and one or more I/O ports. The processor 412 and the I/O subsystem 416 are communicatively coupled to the memory 414. The memory 414 may be embodied as any type of suitable computer memory device (e.g., volatile memory such as various forms of random access memory).

The I/O subsystem 416 is communicatively coupled to a number of components including one or more user input devices 418 (e.g., a touchscreen, keyboard, virtual keypad, microphone, etc.), one or more storage media 420, one or more output devices 422 (e.g., speakers, LEDs, etc.), one or more sensing devices 424, an automated speech recognition (ASR) system 426, a natural language understanding (NLU) system 428, one or more camera or other sensor applications 430 (e.g., software-based sensor controls), and one or more network interfaces 432.

The sensing device(s) 424 may include, for instance, a microphone, a video camera, a still camera, an electro-optical camera, a thermal camera, a motion sensor or motion sensing system (e.g., the MICROSOFT KINECT system), an accelerometer, a proximity sensor, a geographic location system (e.g., Global Positioning System or GPS), a temperature sensor, a physiological sensor (e.g., heart rate and/or respiration rate sensor) and/or any other type of sensor that may be useful to capture multimodal data. The sensing device(s) 424 may be embodied as hardware, software, or a combination of hardware and software (e.g., a hardware receiver/transmitter in combination with signal processing software).

The ASR system 426 identifies spoken words and/or phrases in verbal inputs and, in some embodiments, translates them to text form. There are many ASR systems commercially available; one example is the DYNASPEAK system, available from SRI International. The NLU system 428 can associate semantics with the words identified by the ASR system 426, i.e., for disambiguation. An example of an NLU system is the Natural Language Understanding Toolkit, available from SRI International.

The storage media 420 may include one or more hard drives or other suitable data storage devices (e.g., flash memory, memory cards, memory sticks, and/or others). In some embodiments, portions of systems software (e.g., an operating system, etc.), framework/middleware (e.g., APIs, object libraries, etc.), the multi-task multimodal data capture/access module(s) 110 and/or the multi-task multimodal data analyzer 118 reside at least temporarily in the storage media 420. Portions of systems software, framework/middleware, the multi-task multimodal data capture/access module(s) 110 and/or the multi-task multimodal data analyzer 118 may be copied to the memory 414 during operation of the computing device 410, for faster processing or other reasons.

The one or more network interfaces 432 may communicatively couple the computing device 410 to a network, such as a local area network, wide area network, personal cloud, enterprise cloud, public cloud, and/or the Internet, for example. Accordingly, the network interfaces 432 may include one or more wired or wireless network interface cards or adapters, for example, as may be needed pursuant to the specifications and/or design of the particular computing system 400. The network interface(s) 432 may provide short-range wireless or optical communication capabilities using, e.g., Near Field Communication (NFC), wireless fidelity (Wi-Fi), radio frequency identification (RFID), infrared (IR), or other suitable technology.

The other computing system(s) 442 may be embodied as any suitable type of computing system or device such as any of the aforementioned types of devices or other electronic devices or systems. For example, in some embodiments, the other computing systems 442 may include one or more server computers used to store portions of the hybrid model 132. The computing system 400 may include other components, sub-components, and devices not illustrated in FIG. 4 for clarity of the description. In general, the components of the computing system 400 are communicatively coupled as shown in FIG. 4 by electronic signal paths, which may be embodied as any type of wired or wireless signal paths capable of facilitating communication between the respective devices and components.

Illustrative examples of the technologies disclosed herein are provided below. An embodiment of the technologies may include any one or more, and any combination of, the examples described below.

An example 1 includes a multi-task multimodal data analyzer comprising instructions embodied in one or more non-transitory machine accessible storage media, the multi-task multimodal data analyzer configured to cause a computing system comprising one or more computing devices to: access a set of instances of multi-task multimodal data having at least two different modalities and at least one associated task; and algorithmically learn a shared representation of the multi-task multimodal data using a deep multi-task representation learning.

An example 2 includes the subject matter of example 1, configured to classify the set of multi-task multimodal data by applying a generative/discriminative model to the shared representation of the multi-task multimodal data. An example 3 includes the subject matter of example 1 or example 2, and is configured to, using the deep multi-task representation learning, identify features in the multi-task multimodal data. An example 4 includes the subject matter of any of examples 1-3, wherein the multi-task multimodal data comprises video or images and the multi-task multimodal data analyzer is configured to identify an action-affect feature of the video or images. An example 5 includes the subject matter of any of examples 1-4, and is configured to, using the deep multi-task representation learning, identify a feature in the multi-task multimodal data. An example 6 includes the subject matter of any of examples 1-5, wherein the multi-task multimodal data comprises video or images and the multi-task multimodal data analyzer is configured to identify a feature in the video or images. An example 7 includes the subject matter of any of examples 1-6, wherein the multi-task multimodal data comprises audio and video, and the multi-task multimodal data analyzer is configured to (i) identify features in the audio and video data and (ii) infer a feature based on a combination of audio and video features. An example 8 includes the subject matter of any of examples 1-7, wherein the deep multi-task representation learning comprises a hybrid model having a combined generative/discriminative component, and wherein the multi-task multimodal data analyzer uses the generative aspect and the discriminative aspect simultaneously. An example 9 includes the subject matter of any of examples 1-8, wherein the multi-task multimodal data analyzer is configured to identify at least two different events in the multi-task multimodal data and infer a correlation between the at least two different multi-task multimodal events. An example 10 includes the subject matter of any of examples 1-9, and is configured to algorithmically learn the shared representation of the multi-task multimodal data using an unsupervised machine learning technique. An example 11 includes the subject matter of any of examples 1-10, and is configured to algorithmically infer missing data both within a modality and across modalities An example 12 includes a method for classifying multi-task multimodal data, the multi-task multimodal data comprising data having at least two different modalities and at least one associated task, the method comprising, with a computing system comprising one or more computing devices: accessing a set of multi-task multimodal data; and algorithmically classifying the set of instances of multi-task multimodal data using a combined generative/discriminative model.

An example 13 includes the subject matter of example 12, and includes identifying, within each task and modality of the multi-task multimodal data dynamic and static features. An example 14 includes the subject matter of example 13, and includes, for each modality within the multi-task multimodal data, inferring a feature within the modality. An example 15 includes the subject matter of example 13, and includes fusing features across the different modalities of the multi-task multimodal data, and inferring a feature based on features fused across the different modalities of the multi-task multimodal data.

An example 16 includes a system for algorithmically recognizing a multi-task multimodal event in data, the system including: a data access module to access a set of instances of multi-task multimodal data; a classifier module to classify different instances in the set of instances of multi-task multimodal data; and at least one event recognizer module to (i) recognize multi-task multimodal event based on a plurality of multimodal events identified by the classifier module and (ii) generate a semantic label for the recognized multi-task multimodal event. An example 17 includes the subject matter of example 16, wherein the classifier module is to apply a combined generative/discriminative model to the audio-visual data. An example 18 includes the subject matter of example 17, wherein the event recognizer module is to use a combined generative/discriminative model to recognize the multi-task multimodal event. An example 19 includes the subject matter of example 18, wherein the system is to train the combined generative/discriminative model using a shared representation. An example 20 includes the subject matter of any of examples 16-19, wherein the at least one event recognizer module is to recognize the multi-task multimodal event by correlating a plurality of different multi-task multimodal events whether dynamic or static.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A data analyzer comprising instructions embodied in one or more non-transitory machine accessible storage media, the data analyzer configured to cause a computing system comprising one or more computing devices to:
    access a set of instances of data having a plurality of modalities, wherein the plurality of modalities are associated with a plurality of tasks;
    algorithmically learn a shared representation of the data using a joint optimization of generative and discriminative processes as a single, non-staged framework including parameters learned at the same time and trained in unison; and
    learn an inference model using an iterative bottom-up reconstructive and top-down generative approach.

2. The data analyzer of claim 1, configured to access at least one multi-task multimodal event label and infer data based on the at least one multi-task multimodal event label.

3. The data analyzer of claim 2, configured to generate or morph at least one event into at least one other event.

4. The data analyzer of claim 1, configured to classify the data by applying the discriminative process to the shared representation of the multi-task multimodal data.

5. The data analyzer of claim 1, configured to algorithmically infer missing data both within a modality and across modalities.

6. A method for classifying data, the method comprising, with a computing system comprising one or more computing devices:
    accessing a set of instances of data having a plurality of modalities, wherein the plurality of modalities are associated with a plurality of tasks;
    algorithmically classifying the data using a dynamic hybrid model that uses joint optimization of generative and discriminative processes as a single, non-staged framework including parameters learned at the same time and trained in unison; and
    learning an inference model using an iterative bottom-up reconstructive and top-down generative approach.

7. The method of claim 6, further comprising inferring an affect-task from a human body pose or a human body activity.

8. The method of claim 6, further comprising accessing at least one multi-task multimodal event label and inferring data based on the at least one multi-task multimodal event label.

9. A non-transitory computer readable medium having stored thereon at least one program, the at least one program including instructions which, when executed by a processor, cause the processor to perform a method for algorithmically recognizing a multi-task multimodal event in data, comprising:
    accessing a set of instances of data, each instance having a plurality of modalities, wherein the plurality of modalities having a plurality of associated tasks;
    classifying different instances in the set of data as indicative of different events by applying generative and discriminative processes as a single, non-staged framework including parameters learned at the same time and trained in unison;
    generating a semantic label for at least one recognized event; and
    learning an inference model using an iterative bottom-up reconstructive and top-down generative approach.

10. The non-transitory computer readable medium of claim 9, wherein the method further comprises receiving at least one multi-task multimodal event label and determining at least one multi-task multimodal data set.

11. The non-transitory computer readable medium of claim 10, wherein the at least one multi-task multimodal data set is used to generate a multi-task multimodal event into another multi-task multimodal event.

12. The non-transitory computer readable medium of claim 9, wherein the generative and discriminative processes determine parameters for the inference model.

\* \* \* \* \*